United States Patent [19]

Fox

[11] 4,380,267

[45] Apr. 19, 1983

[54] DOWNHOLE STEAM GENERATOR HAVING A DOWNHOLE OXIDANT COMPRESSOR

[75] Inventor: Ronald L. Fox, Albuquerque, N. Mex.

[73] Assignee: The United States of America as represented by the United States Department of Energy, Washington, D.C.

[21] Appl. No.: 222,854

[22] Filed: Jan. 7, 1981

[51] Int. Cl.³ .................... E21B 43/24; F22D 1/18; F23D 15/04
[52] U.S. Cl. .................................. 166/303; 166/59; 431/157; 431/162; 431/190
[58] Field of Search ............... 166/59, 57, 303, 302, 166/256, 261; 175/12, 14; 431/157, 162, 190

[56] References Cited

U.S. PATENT DOCUMENTS

| | | | |
|---|---|---|---|
| 2,668,592 | 2/1954 | Piros et al. | 166/59 X |
| 2,823,752 | 2/1958 | Walter | 166/57 X |
| 2,985,240 | 5/1961 | Emery | 166/59 |
| 4,078,613 | 3/1978 | Hamrick et al. | 166/59 X |

OTHER PUBLICATIONS

Fox et al., "Analysis of the Injection of Steam Into Deep Reservoirs For the Recovery of Tertiary Oil", 17th Aerospace Sciences Meeting, New Orleans, LA, 1-1979, (Sandia Lab. Pub. SAND 79-0202).

*Primary Examiner*—Stephen J. Novosad

[57] ABSTRACT

Apparatus and method for generation of steam in a borehole for penetration into an earth formation wherein a downhole oxidant compressor is used to compress relatively low pressure (atmospheric) oxidant, such as air, to a relatively high pressure prior to mixing with fuel for combustion. The multi-stage compressor receives motive power through a shaft driven by a gas turbine powered by the hot expanding combustion gases. The main flow of compressed oxidant passes through a velocity increasing nozzle formed by a reduced central section of the compressor housing. An oxidant bypass feedpipe leading to peripheral oxidant injection nozzles of the combustion chamber are also provided. The downhole compressor allows effective steam generation in deep wells without need for high pressure surface compressors. Feedback preheater means are provided for preheating fuel in a preheat chamber. Preheating of the water occurs in both a water feed line running from aboveground and in a countercurrent water flow channel surrounding the combustor assembly. The countercurrent water flow channels advantageously serve to cool the combustion chamber wall. The water is injected through slotted inlets along the combustion chamber wall to provide an unstable boundary layer and stripping of the water from the wall for efficient steam generation. Pressure responsive doors are provided at the steam outlet for closing and sealing the combustion chamber from entry of reservoir fluids in the event of a flameout.

14 Claims, 5 Drawing Figures

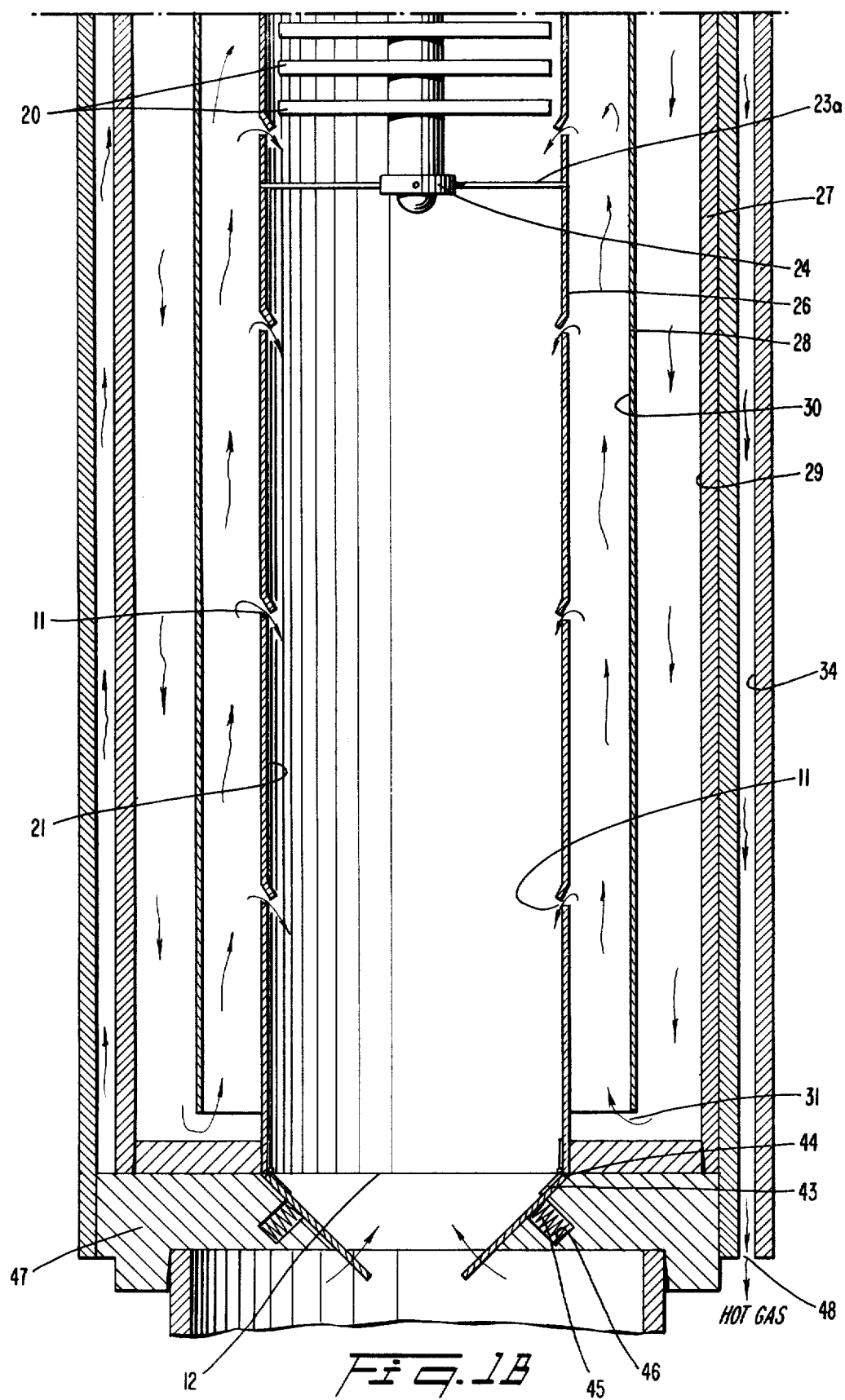

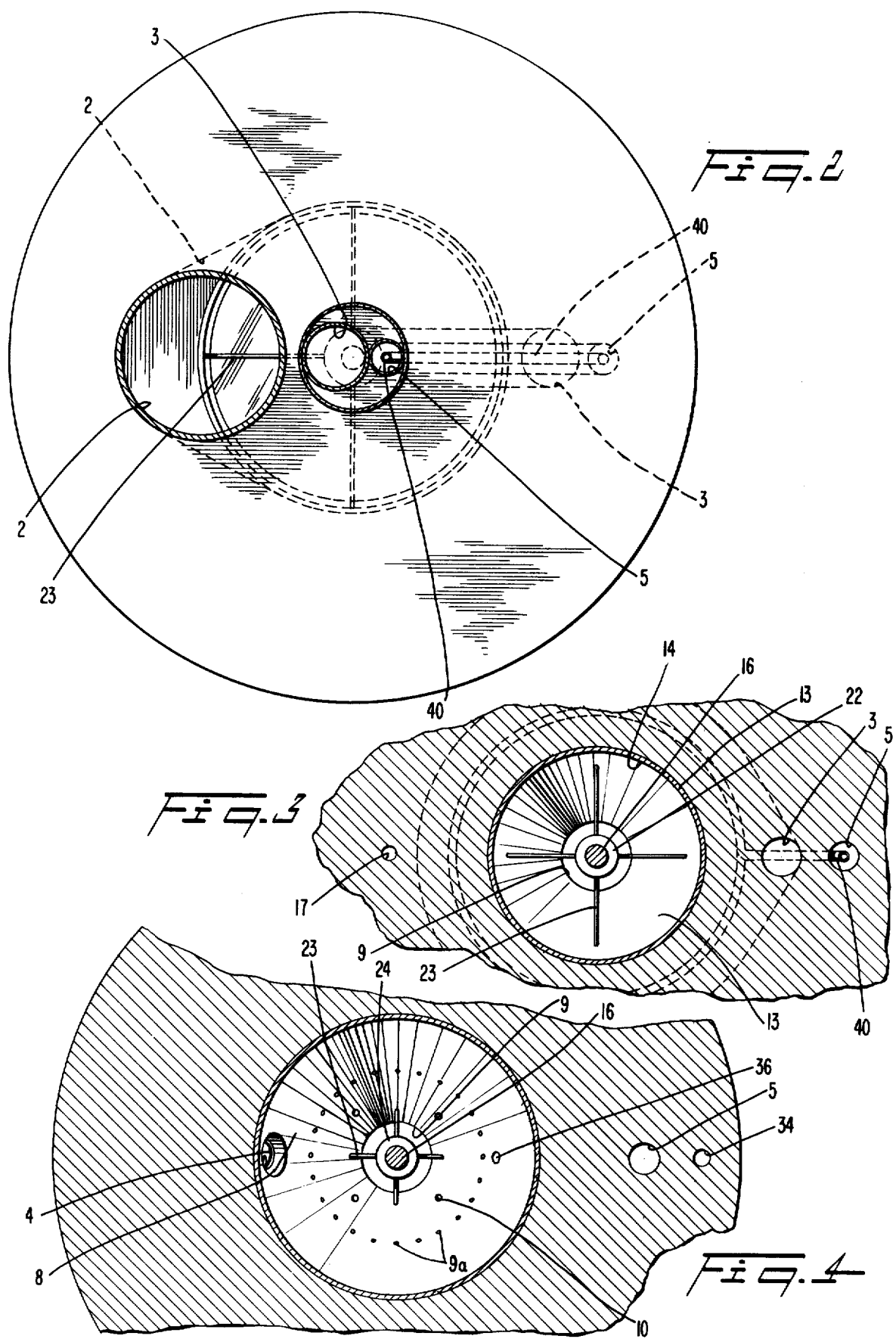

DOWNHOLE STEAM GENERATOR HAVING A DOWNHOLE OXIDANT COMPRESSOR

The U.S. government has rights in this invention pursuant to Contract No. AT(29-1)-789 and modifications between the U.S. Department of Energy and Western Electric Company, Inc.

BACKGROUND OF THE INVENTION

The invention is in the area of tertiary oil recovery techniques, in particular, an improved apparatus for downhole injection of steam into boreholes.

In the art of recovering oil from earth formations, tertiary methods are increasing in their importance. Initially, oil flow from many wells is driven by the pressure due to natural gases trapped along with the liquid oil in the formation. With the passage of time, natural gas pressures decrease. When gas pressure is insufficient to drive oil to the surface, pumping methods are then employed. As time passes, pumping methods may be ineffective because the flow of oil underground out of porous formations into a well may be very slow. It is at this point that tertiary methods are sought to accelerate the flow of oil from the formation into the well. A particularly useful tertiary method employs the injection of steam. Steam serves to heat the oil in the formation, thereby reducing its viscosity and increasing its flow rate into the well for recovery.

Methods employing downhole generation of steam within a well have proved to be particularly advantageous. The prior art discloses representative methods and apparatus.

In U.S. Pat. No. 3,456,721, Smith discloses a downhole burner for generating steam. Gaseous or liquid fuels are mixed with air and combusted in a burner with simultaneous spraying of water toward the flame. The water is sprayed from a cylindrical water jacket through a plurality of orifices. Steam is formed by the vaporization of the water as the water bombards the flame.

In U.S. Pat. No. 3,980,147, Gray discloses a downhole steam injector employing the combustion of hydrogen with oxygen to generate heat to vaporize injected water to form steam. The water moves in a single direction through an annular preheater jacket surrounding the combustion chamber, and, after being preheated, enters the combustion chamber through a plurality of grooves or passages at the top of the combustion chamber near the igniter and the hydrogen/oxygen flame.

Hamrick et al in their related U.S. Pat. Nos. 3,982,591 and 4,078,613 disclose downhole steam generators. In the first patent, in FIG. 17, water is injected through a plurality of apertures directly into a flame in a hydrogen/oxygen combustion zone. In the second patent, as shown in FIG. 2B, the oxidant is injected by an outer concentric tube surrounding the fuel nozzle. The envelope of oxidant around the steam of fuel tends to inhibit good mixing in the combustion zone. The water moves through a cooling annulus in a single direction before it is injected into a mixing zone spaced below the combustion zone. The mixing zone is defined by a cylindrical wall which has a plurality of apertures through which water from the cooling annulus passes laterally into the mixing zone. A heat-resistant liner is placed along the interior of the combustion zone.

Several problems have been encountered with these prior art downhole steam generators. One problem is the necessity of supplying air (the oxidant) downhole at relatively high pressure requiring expensive high pressure surface compressors. The air pressure required for the operation of the steam generator increases with increasing well depth. Providing greater downhole air pressure for deeper wells requires greater consumption of fuel to drive the high pressure compressors. Ecology problems are associated with atmospheric exhausting of fuels burned to operate the surface compressors.

A related problem, as pointed out above in relation to the Hamrick et al patent '613, is getting a good mixture of the fuel and oxidant for more complete combustion.

Another problem relates to overheating of the boundary layer adjacent the inner wall of the combustion zone. The boundary layer which is thick and of low velocity leads to deterioration of combustion chamber walls and excessive thermal conduction from the combustion zone to pre-combustion areas.

A problem prevalent with the prior art devices employing heat-resistant combustion zone liners is that the liners are not cooled adequately by adjacent heat transfer jackets through which water flows in a single direction. As a consequence, the liners cannot withstand the prolonged high temperatures from the combustion zone and undergo severe deterioration.

Problems are also encountered relative to the efficient preheating of the fuels and water used in the downhole steam generator. To explain, liquid fuels may be relatively cold at the surface prior to pumping downhole. As a result, the combustion process itself must give up heat to the liquid fuel to bring it up to combustion temperatures. Cool fuel results in production of soot, which is undesirable because of surface air pollution or clogging of pores in the earth formation. Similarly, water may be relatively cold at the surface prior to pumping downhole. As a result, a considerable portion of the heat generated by the combustion process is consumed in bringing the water up to the boiling point. Thus, less energy is available for driving high enthalpy steam into the earth formation.

Conditions downhole may occasionally occur which tend to flood the combustion chamber with reservoir fluids. This occurs particularly when a temporary interruption of combustion such as a flameout is experienced. A need for efficient means for isolating and protecting the combustion chamber is thus indicated.

SUMMARY OF THE INVENTION

In view of the deficiencies and inadequacies described above, it is an object of the invention to provide an apparatus for downhole steam generation without using high pressure surface compressors for supplying high pressure or downhole.

A related object is to provide a method for operating a downhole steam generator employing the step of compressing air downhole.

Another object is to provide a plurality of separate oxidant injection nozzles for improved mixing with the fuel, both at the center and around the periphery of the combustion chamber.

Another object of the invention is to provide an apparatus for efficiently preheating and injecting the water in the boundary layer adjacent the inner wall of the combustion zone and for providing an unstable boundary layer for more efficient stripping of the water into the hot combustion gas flow.

Another object of the invention is to provide an apparatus for downhole steam generation in which the walls of the combustion zone are cooled more effectively to preclude deterioration.

An additional object of the invention is to provide an apparatus for efficiently preheating liquid fuels prior to combustion in the combustion chamber of the downhole steam generator.

A further object of the invention is to provide a downhole steam generator having unique apparatus for increasing the ability to preheat the water prior to volatilization to form steam.

Still another object of the invention is to provide a downhole steam generator having spring-biased and/or pressure activated doors at the steam outlet to protect the combustion chamber and other components from being flooded by reservoir fluids in the event of a flameout.

Additional objects, advantages, and novel features of the invention will be set forth in part in the description which follows and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention as described herein, an apparatus for generation of steam in a borehole for penetration into an earth formation is described including: an oxidant supply, a fuel supply; an igniter; a water supply; an oxidant compressor; and a combustor assembly. The fuel and oxidant mixture is efficiently mixed and combusted in a combustion chamber of the combustor assembly to provide hot expanding combustion gases for driving the oxidant compressor, for preheating the fuel and water, and for converting the water into steam.

The compressor is driven by a turbine in the combustion chamber. Low pressure oxidant, such as surface atmospheric air, is compressed into a high pressure oxidant. For greater combustion efficiency with the fuel, a central oxidant nozzle and a ring of peripheral nozzles or inlets for oxidant, are provided. A plurality of fuel nozzles are positioned between the two. As fuel and oxidant are thus efficiently mixed and combusted in the combustion chamber, water is injected into the combustion chamber in a steam generation zone. The heat of combustion converts the water to steam. The steam exits from an outlet and penetrates into the earth formation.

Preferably, the compressor includes a housing, a drive shaft and a plurality of compressor stages mounted on the shaft. The shaft extends through a central reduced portion forming the central, high velocity nozzle. Downstream of the combustion zone, a plurality of turbine stages are mounted on the shaft. In accordance with the invention, the shaft is supported by strut supported bearing assemblies mounted in the housing.

In operation of the steam generator, combustion gases produced in the combustion chamber drive the gas turbine, shaft, and compressor. The compressor takes air at relatively low pressure, such as atmospheric, and compresses it into relatively high pressure air prior to entry into the combustion chamber where the compressed air and fuel mixture are combusted. A bypass oxidant feed pipe leads from the compression chamber and conveys additional high pressure oxidant to the combustion chamber via a manifold and a plurality of nozzles to allow greater mixing and thus more combustion output. By employing the downhole compressor assembly as described, the need for high pressure surface compressors for oxidants is eliminated. Also, the downhole oxidant compressor increases the depth at which the downhole steam generator can operate efficiently.

As briefly mentioned above, the fuel supply includes a plurality of fuel nozzles placed around the periphery of the combustion chamber between the central nozzle and the peripheral oxidant nozzles. In this location, the fuel emerging from the fuel nozzles is subjected to multiple mixing action from the central and peripheral oxidant streams and is very efficiently mixed with the oxidant.

In accordance with a further aspect of the invention, improved means are provided for preheating the liquid fuel portion to combustion. One fuel preheater apparatus includes a hot gas feedback conduit connected to the combustion chamber and a preheater tube traversing a fuel preheat chamber. Hot combustion gases pass through the hot gas feeback conduit and the preheater tube to efficiently preheat the fuel.

Another fuel preheater structure derives its heat directly from the hot combustion chamber walls. A portion of the fuel preheat chamber jackets a portion of the combustion chamber. Heat from the combustion chamber is conducted directly through the wall to preheat the fuel. The fuel nozzles are preferably mounted in the wall.

Another fuel preheater apparatus is provided by a steam and hot gas feedback channel open to the borehole below the steam outlet. The steam and hot gas feedback conduit merges with the hot gas feedback conduit leading from the combustion chamber and conveys steam and hot gases from the borehole to the preheat chamber to further preheat the fuel. The two gas conduits merge in a Venturi-like junction so that the steam and hot gases are positively drawn into the preheater tube by the high pressure, high velocity combustion chamber gas. After traversing the preheat chamber, the steam and hot gases from the borehole pass along with the merged hot gases from the combustion chamber to an exhaust pipe. The steam and hot borehole gases in conjunction with the combustion chamber gases provide a particularly efficient heat transfer medium for preheating the fuel.

In accordance with another aspect of the invention, improved means are provided for preheating the water prior to conversion into steam. The exhaust pipe carrying gases from the preheater tube in the fuel preheat chamber, is positioned inside the water supply line. As hot gases and steam flow to the surface through the exhaust pipe, the water moving downward toward the steam generator is preheated.

An additional apparatus for preheating the water prior to conversion into steam includes counterflow annular water flow channels. The water flow channels serve to both preheat water and to cool the wall of the combustion chamber. Preferably, the wall of the combustion chamber has slots for injection of water for steam generation. The location and size of the slots provide an unstable boundary layer and provide efficient conversion of water into steam.

The water flow channels are formed by a cylindrical outer housing sleeve, a cylindrical inner sleeve, and the combustion chamber wall in concentric relationship with spaces therebetween. The space between the outer sleeve and the inner sleeve defines a first annular waterflow channel. The space between the inner sleeve and the combustion chamber wall defines a second annular waterflow channel. A passage connects the first and second flow channels resulting in a downward and upward or counterflow of water through the channels. The flow of water in this counter-current manner serves to provide more efficient cooling of the wall of the combustion chamber and effective preheating of the water prior to steam generation.

By efficient cooling of the walls of the combustion chamber, overheating of the boundary layer adjacent the inner wall of the steam generation zone is avoided thereby significantly improving steam generation. In addition, the thickness of the boundary layer adjacent the inner wall of the steam generation zone is reduced, and the velocity of the boundary layer is increased. Also, deterioration of the walls is reduced considerably or eliminated by keeping the walls cooled adequately. By conducting heat from the steam generation zone wall to the water, the water is preheated and brought to near the boiling point prior to injection into the hot combustion gases. Thus, less heat is required to produce steam inside the combustion chamber, and more heat energy is available for driving the steam to penetrate into the earth formation.

The steam outlet to the borehole is provided with pressure-responsive doors for closing the outlet in response to flameout. Thus, if steam pressure at the outlet and within the borehole is suddenly reduced, the pressure-responsive doors close, thereby preventing flooding of the combustion chamber by the fluid, such as water, in the borehole.

Still other objects and advantages of the present invention will become readily apparent to those skilled in this art from the following detailed description, wherein I have shown and described the preferred embodiment of the invention, simply by way of illustration of the best modes contemplated for carrying out the invention. As will be realized, the invention is capable of other and different embodiments and its several details are capable of modification in various obvious respects, all without departing from the invention. Accordingly, the drawings and description are to be regarded as illustrative in nature, and not as restrictive.

BRIEF DESCRIPTION OF THE DRAWINGS

The accompanying drawings, which are incorporated in and form a part of this specification, illustrate several aspects of the present invention, and, together with the description, serve to explain the principles of the invention.

In the drawings:

FIGS. 1A and 1B are taken together to be a longitudinal cross-sectional view partially broken away illustrating a downhole steam generator of the invention;

FIG. 2 is a lateral cross-sectional view of the steam generator taken along lines 2—2 of FIG. 1A illustrating the supply line and exhaust line arrangement;

FIG. 3 is a lateral cross-sectional view of the steam generator taken along lines 3—3 of FIG. 1A illustrating the lower section of the compression chamber;

FIG. 4 is a lateral cross-sectional view of the steam generator taken along lines 4—4 of FIG. 1A illustrating the upper portion of the combustion chamber.

DETAILED DESCRIPTION OF THE INVENTION

Figure 1A:
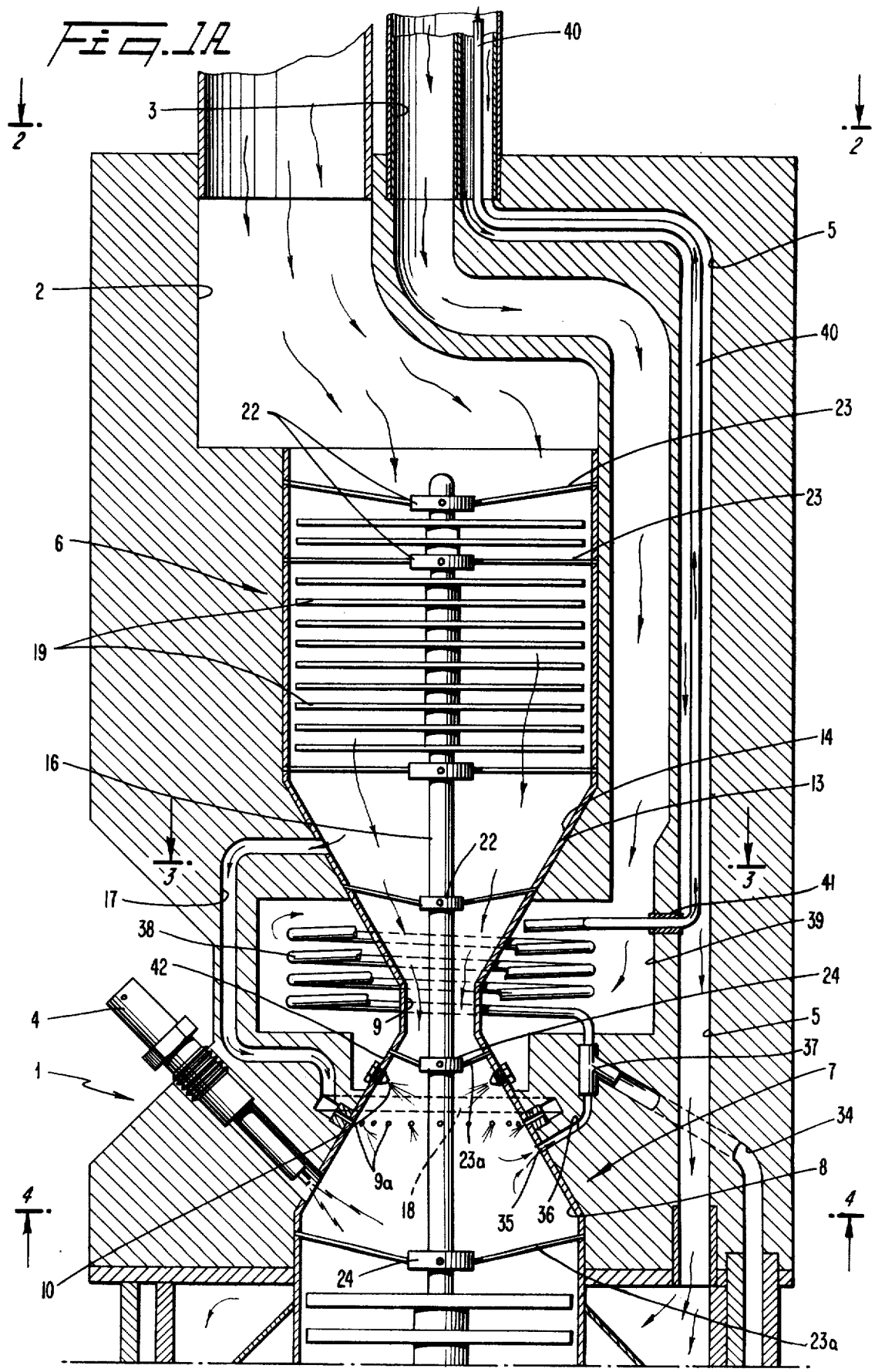

With more specific reference to FIGS. 1A and 1B, the apparatus 1 for generation of steam in a borehole for penetration into an earth formation comprises an oxidant supply shaft 2; a fuel supply line 3 for supplying fuel to be combusted when mixed with the oxidant; an igniter such as a glow plug 4 for igniting the fuel and oxidant mixture; a water supply line 5 for providing water to be converted to steam by the heat of combustion of the fuel and oxidant mixture; an oxidant compressor assembly 6 where low pressure oxidant is compressed to a high pressure oxidant; and a combustor assembly 7 where combustion takes place and the steam is generated in a lower steam generation zone. The combustor assembly 7 includes a combustion chamber 8 having a central oxidant nozzle 9, peripheral oxidant nozzles 9a (see also FIG. 4), fuel inlets such as atomizing nozzles 10, water inlets such as downwardly directed slots 11, and a steam outlet 12, In accordance with the preferred apparatus and method of operation of the invention, oxidant, preferably air, enters combustor assembly 7 from air shaft 2, open to surface atmospheric air, and is compressed downhole by compressor assembly 6 to a relatively high pressure. The high pressure air passes through the tapered, reduced section of the compression chamber, accelerated to a high velocity and is injected through central nozzle 9 and a ring of peripheral oxidant inlets 9a into the combustion chamber 8. The fuel is injected through peripheral atomizing nozzles 10, between the central nozzle 9 and the peripheral nozzles 9a. This results in an efficiently mixed fuel and oxidant mixture ignited by the glow plug 4 to provide hot, high pressure, expanding combustion gases.

Water is injected into the combustion chamber 8 in the steam generation zone 21 through the downwardly directed water inlet slots 11. The injected water produces steam and passes through the steam outlet 12 and is injected, as desired, into the borehole.

As the water enters combustion chamber 8 through downwardly directed slots 11 in combustion chamber wall 26, the fluid boundary layer adjacent to wall 26 is stirred up and made highly unstable. As a result, the thickness of the boundary layer is reduced considerably, and the velocity of its swirling movement is increased. The boundary layer of decreased thickness and increased velocity results in a more efficient stripping of the water entering the steam generation zone 21 from the wall 26, and thus a better mixing of the fluids. A much enhanced ability to generate high enthalpy steam results. In addition to this optimization of the vaporization process, the combustion chamber wall 26 remains cool and thus the thermal stress is minimized.

In the preferred embodiment of the invention, the compressor assembly 6 includes a housing 13 defining an oxidant compression chamber 14 aligned with and connected to the combustion chamber 8 by the central nozzle 9 to feed compressed oxidant to the combustion chamber 8. A drive shaft 16 extends axially through the chambers 8 and 14 and the central nozzle 9. For conveying the supplemental high pressure oxidant to the combustion chamber 8, an oxidant bypass feed pipe 17 leads from the compression chamber 14 to manifold 18 and to the peripheral oxidant nozzles 9a.

The shaft 16 is rotatably supported by plural bearing assemblies. First bearing assemblies 22 are connected to the housing 13 by struts 23 and support the shaft 16 in the compression chamber 14. Second bearing assemblies 24 are connected to the wall of combustion chamber 8 by struts 23a.

A multi-stage axial compressor 19 having vanes (not shown) of increasing pitch to give desired compressing effect to the oxidant is mounted on the shaft 16 in the housing 13. A multi-stage gas turbine 20 having blades (not shown) is mounted on the shaft 16 in the combustion chamber 8. The hot expanding high pressure combustion gases drive the gas turbine 20. The compressor 19 and turbine 20 being mounted on the same shaft 16, the torque to power the compressor 19 is provided. Since all of the moving parts of the compressor assembly 6 involve only rotative motion; the maintenance requirements should, therefore, be kept to a minimum.

After driving the turbine 20, the hot combustion gases pass downstream to the steam generation zone 21 where water is injected to produce steam for penetration into the borehole.

In addition to the heat provided by the combustion gases and steam, the combustion gases themselves aid in the flow of the crude oil. The carbon dioxide resulting from burning of the fuel is soluble in crude oil and reduces the oil viscosity. Carbon dioxide, sulfur oxides, and nitrogen oxides form acids when combined with water. The acids increase the porosity of the reservoir and enhance the flow rate of the crude oil to the production well.

As shown in FIGS. 1A and 2, air shaft 2 is of relatively large diameter. Air shaft 2 is open at the surface and receives atmospheric air when the compressor assembly 6 is in use. The large diameter open air shaft 2 provides low resistance to high volume air flow which is drawn downhole by a partial vacuum created when the compressor vanes are in operation. An adequately large air shaft 2 assures that compressor assembly 6 receives a sufficient air supply at whatever depth the downhole steam generator is operated.

By using downhole compressor assembly 6 for supplying high pressure air to the combustion chamber 8, the need for expensive high pressure surface compressors is eliminated. Furthermore, generation of steam in deeper wells is practicable because the apparatus for pressurizing the air is not limited by the depth at which the downhole steam generator operates.

It is well known that the temperature of air is increased when it is compressed. Consequently, high pressure air entering the combustion chamber 8 is preheated resulting in a more effective oxidant in the combustion process.

In accordance with another aspect of the invention of the downhole steam generator, apparatus is provided for preheating both the water and fuel prior to use. The water is first preheated by countercurrent water flow. To do this, there is provided a cylindrical outer housing sleeve 27, a cylindrical inner sleeve 28, spaced between and concentric with respect to both the outer sleeve 27 and the combustion chamber wall 26. The annular space between the outer sleeve 27 and the inner sleeve 28 is connected to the water supply 5 and defines a first flow channel 29. The annular space between the inner sleeve 28 and the combustion chamber wall 26 defines a second flow channel 30. A passage 31, defined by the lower edge of inner sleeve 28, interconnects the first and second water flow channels 29 and 30 adjacent the bottom of the generator. Thereby, downward and upward flow or countercurrent flow of water through channels 29 and 30 preheats the water prior to entry into the steam generation zone 21. Conversely, the water flow cools the combustion chamber wall 26. The more efficiently preheated water allows less heat from the combustion gases to be drained off for heating the water, and thus allows more heat energy to be available for generating high enthalpy steam and driving the steam into the earth formation.

For the second water preheating means, and the fuel preheating means, a portion of the combustion gases are bled from the combustion chamber 8 through orifice 35 to a hot gas feedback conduit 36 connected at junction 37 to a spiral preheater tube 38. The tube 38 passes through a fuel preheat chamber 39 wherein the fuel is preheated by heat transfer. The preheater tube 38 is connected to an exhaust pipe 40 (see FIGS. 1A and 2) merging into concentric relationship with the water supply line 5 at junction 41 and extending out of the borehole to the surface. The concentric relationship with the water supply line serves to form a highly efficient heat transfer relationship for stripping the heat from the hot products of combustion for preheating the water.

Preheater tube 38 is also connected to a steam and hot gas feedback conduit 34 at junction 37. The steam and hot gas conduit 34 merges with the hot gas feedback conduit 36 in the junction 37. The high velocity gas in conduit 36 is such that the steam and gases are positively drawn into the preheater tube 38. The steam and hot gas feedback conduit 34 extends around the cylindrical outer housing sleeve 27 with a plurality of orifices 48 (only one shown in FIG. 1B) communicating with the borehole. Thus, steam and hot combustion gases pass from the borehole, through orifice 48, through conduit 34, to junction 37, to preheater tube 38, to junction 41, and to exhaust pipe 40 where they serve to preheat the water in concentric water supply line 5. Thus, the water in supply line 5 is preheated by the mixture of steam and hot gases derived from the combustion process, both before and after the production of steam providing a highly efficient heat transfer medium.

As mentioned above, fuel is preheated in preheat chamber 39 by preheater tube 38. In accordance with another aspect of the present invention, fuel is preheated additionally by direct heat transfer across the combustion chamber wall 26 at peripheral wall portion 42.

In accordance with another aspect of the invention, pressure responsive doors 43 having hinges 44 are installed at the steam outlet 12. Doors 43 may be biased closed by compression springs 45 retained in recesses 46 of bottom cap 47. The doors 43 are biased closed against the force of the steam and combustion gases emerging under pressure from outlet 12. Steam and gases emerge from the outlet 12 so long as the steam and gas pressure is greater than the back pressure within the borehole plus the pressure exerted by the springs 45. Conversely, in the event of a flameout, the springs 45 quickly close the doors 43 preventing contamination of the combustion chamber 8 by reservoir fluids.

During operation of the downhole steam generator, the water flow through water supply 5 is regulated so that the water entering the steam generation zone 21 is preheated and near the steam point. Rates of fuel and oxidant consumption are controlled to optimize the conditions for preheating the fuel and the water from the hot combustion products and for converting the water into steam. Preferred fuels are liquid hydrocarbons such as diesel fuel, kerosene, fuel oil and the like.

Thus, in summary, it will now be realized that the downhole steam generator 1 of the present invention provides substantial results and advantages over prior art devices. Employing a downhole air compressor assembly 6 eliminates the need for high pressure surface compressors and increases the effective depth at which the downhole steam generator can operate.

Substantially more efficient preheating of the fuel and water is accomplished by the feedback heating conduits 34, 35, 38 and 40. The counterflow of water through the channels 29 and 30 allows the preheating water function to occur and at the same time maintains a constant, relatively cool temperature for the combustion chamber wall 26 in order to relieve the thermal stresses that would otherwise occur.

The steam generation zone 21 of the combustor assembly 7 of the invention is designed with the downwardly directed slotted inlets 11, and the flow rate of the water is so regulated so as to provide an unstable boundary layer along the combustion chamber wall 26. This ensures an enhanced mixing of the hot gases with the water entering the zone to be converted into steam and a continuous stripping action of water from the wall 26 as desired.

By using pressure responsive doors 43 at the steam outlet 12, water present in the borehole is prevented from entering the combustion chamber 8 in the event of a flameout.

By employing a central oxidant nozzle 9, a ring of peripheral oxidant nozzles 9a, and a ring of peripheral fuel nozzles 10 placed therebetween, a highly efficient fuel and oxidant mixing arrangement results. The oxidant and fuel intermix efficiently as a result of the turbulence created by the crisscrossing of the plurality of fluid streams.

The foregoing description of the preferred embodiment of the invention has been provided for purposes of illustration and description. It is not intended to be exhaustive or to limit the invention to the precise form disclosed. Obvious modifications and variations are possible in light of the above teachings.

The embodiment was chosen and described in order to best explain the principle of the invention and its practical application to thereby enable others skilled in the art to best utilize the invention in various embodiments and with various modifications as are suited to the particular use contemplated. It is intended that the scope of the invention be defined by the claims appended hereto.

I claim:

1. An apparatus for generation of steam in a borehole for penetration into an earth formation, comprising:
   a housing adaptable for insertion into the borehole;
   an oxidant supply means;
   a fuel supply means for supplying fuel;
   a combustor assembly having a combustion chamber contained in said housing for receiving, mixing and combusting said oxidant and fuel for generating hot combustion gases;
   an igniter means for igniting the fuel and oxidant mixture in said chamber;
   a water supply means for injecting water into said combustion chamber to be converted to steam by the heat of combustion;
   oxidant compressor means contained in said housing for compressing the oxidant prior to injection into said chamber;
   means for driving said compressor means by said hot combustion gases; and
   steam outlet means for ejecting the hot combustion gases and steam for penetration into the earth formation.

2. The steam generation apparatus of claim 1 1 wherein said fuel supply means includes at least one fuel nozzle mounted in a wall forming said combustion chamber, a fuel preheat chamber on the opposite side of said wall upstream of said fuel nozzle for preheating fuel prior to combustion.

3. The steam generation apparatus of claim 2 further comprising a hot gas feedback conduit leading from said combustion chamber and traversing said fuel preheating chamber.

4. The steam generation apparatus of claim 3 wherein said hot gas feedback conduit includes an exhaust pipe, said water supply means includes a water line, and said exhaust pipe mounted in said water line thereby serving to preheat the water before entry into said combustion chamber.

5. The steam generation apparatus of claim 4 further comprising:
   a steam and gas feedback channel from the borehole below said steam outlet means;
   said steam and gas feedback conduit being connected to said feedback conduit and conveying steam and hot gases from the borehole to said preheat chamber to preheat the fuel.

6. The steam generation apparatus of claim 1 further comprising a cylindrical outer housing sleeve, a cylindrical inner sleeve spaced between and concentric with respect to both said outer sleeve and a wall defining said combustion chamber, the space between said outer sleeve and said inner sleeve connected to said water supply means and defining a first annular water flow channel, the space between said inner sleeve and said combustion chamber wall connected to said water supply means and defining a second annular water flow channel, and passage means interconnecting said first and second flow channels, whereby downward and upward flow of water through said channels cools said combustion chamber and preheats the water in a countercurrent manner.

7. The steam generation apparatus of claim 1 further comprising spring-biased door means for closing and opening said steam outlet means in response to the pressure in said combustion chamber.

8. An apparatus for generation of steam in a borehole comprising:
   an oxidant supply means;
   a fuel supply means for supplying fuel;
   a combustor assembly having a combustion chamber for receiving, mixing and combusting said oxidant and fuel for generating hot combustion gases;
   an igniter means for igniting the fuel and oxidant mixture in said chamber;
   a water supply means for injecting water into said combustion chamber to be converted to steam by the heat of combustion;
   oxidant compressor means for compressing the oxidant prior to injection into said chamber;
   means for driving said compressor means by said hot combustion gases; and steam outlet means for injecting the hot combustion gases and steam for penetration into the earth formation;

wherein said compressor comprises a housing, a compression chamber defined by said housing, aligned and connected to said combustion chamber by a central nozzle to feed compressed oxidant to said combustion chamber, a shaft extending axially through said chambers and said central nozzle, bearing means supporting and allowing rotation of said shaft, said driving means including a turbine mounted on said shaft in said combustion chamber.

9. The steam generation apparatus of claim 8 wherein oxidant supply means further comprises an oxidant bypass feedpipe leading from said compression chamber to said combustion chamber for conveying supplemental high pressure oxidant to said combustion chamber.

10. The steam generation apparatus of claim 9 wherein said oxidant feedpipe includes an annular manifold around the periphery of said combustion chamber and a plurality of peripheral nozzles connected to said manifold for injection of multiple streams of high pressure oxidant for improved mixing with the fuel and enhanced combustion.

11. The steam generation apparatus of claim 10 wherein said fuel supply means includes a plurality of fuel nozzles around the periphery of said combustion chamber between said central nozzle and said peripheral nozzles.

12. An apparatus for generation of steam in a borehole for penetration into an earth formation comprising:
   an oxidant supply means;
   a fuel supply means for supplying fuel;
   a combustor assembly having a combustion chamber for receiving, mixing and combusting said oxidant and fuel for generating hot combustion gases;
   an igniter means for igniting the fuel and oxidant mixture in said chamber;
   a water supply means for injecting water into said combustion chamber to be converted to steam by the heat of combustion;
   said oxidant supply means including a plurality of peripheral nozzles around the periphery of said combustion chamber for injection of multiple streams of high pressure oxidant for improved mixing with the fuel and enhanced combustion, wherein said oxidant nozzles are mounted on an annular manifold extending around the periphery of the combustion chamber, and including a central nozzle to feed compressed oxidant to said combustion chamber.

13. The steam generation apparatus of claim 12 wherein said fuel supply means includes a plurality of fuel nozzles around the periphery of said combustion chamber between said central nozzle and said peripheral nozzles.

14. In operation of a downhole steam generation for injecting steam into an earth formation, a method comprising the steps of:
   compressing oxidant downhole to a relatively high pressure by compressor means;
   injecting the high pressure oxidant into a combustion chamber;
   injecting fuel into the combustion chamber to produce a fuel and oxidant mixture;
   igniting the fuel and oxidant mixture thereby producing high pressure expanding combustion gases;
   driving a turbine employing the driving force of the expanding combustion gases;
   powering the compressor means by the turbine;
   transferring the hot combustion gases downstream of the turbine to a steam generation zone;
   injecting water into the steam generation zone to produce steam; and
   injecting the steam into the earth formation.

* * * * *